United States Patent [19]
Spagnoli

[11] Patent Number: 5,153,027
[45] Date of Patent: Oct. 6, 1992

[54] PREPARATION OF DIFFERENTIAL THICKNESS COATINGS BY DIP COATING WHERE THE SUBSTRATE IS PIVOTED

[75] Inventor: Robert A. Spagnoli, Port Huron, Mich.

[73] Assignee: Ford Motor Company, Dearborn, Mich.

[21] Appl. No.: 712,295

[22] Filed: Jun. 10, 1991

[51] Int. Cl.⁵ .............................................. B05D 5/06
[52] U.S. Cl. ................................ 427/163; 427/169; 427/287; 427/346; 427/430.1; 118/416
[58] Field of Search .............. 427/430.1, 346, 163, 427/169, 287; 118/56, 416

[56] References Cited

U.S. PATENT DOCUMENTS

| | | | |
|---|---|---|---|
| 3,105,776 | 10/1963 | Weyhmueller | 118/416 |
| 3,341,353 | 9/1967 | Johnson | 427/430.1 |
| 3,429,358 | 2/1969 | Tingquist et al. | 118/416 |
| 4,268,206 | 5/1981 | Johnson | 118/416 |
| 4,271,210 | 6/1981 | Yoldas | 427/169 |
| 4,455,322 | 6/1984 | Weber | 427/8 |
| 4,597,931 | 7/1986 | Watanabe et al. | 427/430.1 |
| 5,061,529 | 10/1991 | Ruehl | 427/430.1 |

Primary Examiner—Shrive Beck
Assistant Examiner—Katherine A. Bareford
Attorney, Agent, or Firm—Charles H. Ellerbrock; Clifford L. Sadler

[57] ABSTRACT

A substrate, bearing a coating having a thickness which varies in more than one direction across the surface of the substance, is prepared by a process wherein the substrate is immersed into a coating medium bath, then withdrawn in a predetermined direction and at a predetermined rate, and simultaneously pivoted at a predetermined angular velocity about an axis which is orthogonal to the direction of withdrawal.

12 Claims, 1 Drawing Sheet

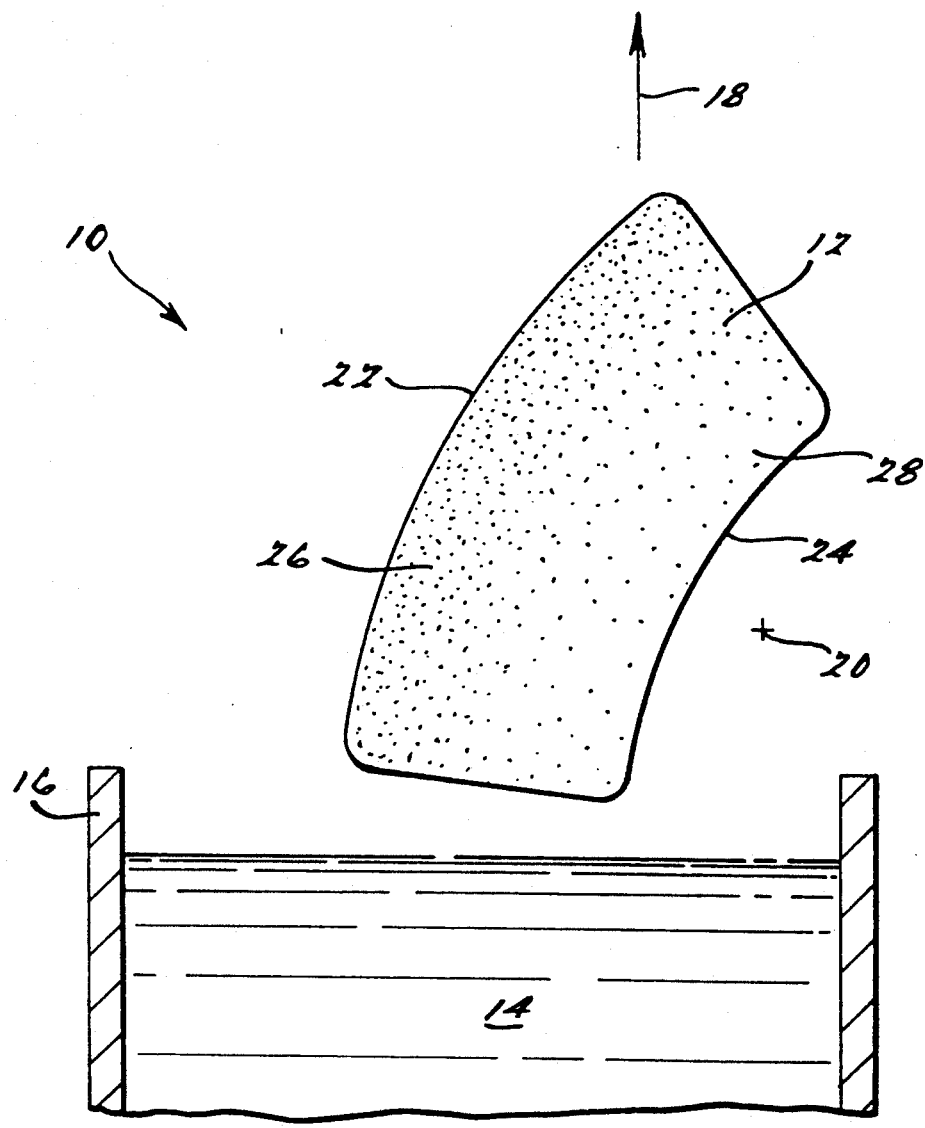
FIG.

5,153,027

PREPARATION OF DIFFERENTIAL THICKNESS COATINGS BY DIP COATING WHERE THE SUBSTRATE IS PIVOTED

FIELD OF THE INVENTION

This invention relates generally to a process for preparing differential thickness coatings on substrates. More particularly, the invention relates to a method for withdrawing a substrate from a dip-coating solution, to produce a coating which varies in thickness in more than one direction across the surface of the coated substrate.

BACKGROUND OF THE INVENTION

Light transmissive metal oxide coatings may be applied to glass substrates by a number of dip-coating processes such as the well-known sol-gel process, wherein the glass substrate is immersed into a solution containing hydrolyzable metal compounds, the glass substrate is withdrawn at a specific, uniform rate into an atmosphere of known water content to form a gel on the surface of the glass substrate, and finally the substrate is heated to about 450° C. to densify the gel to form a metal oxide coating. The thickness of the ultimately produced metal oxide coating is primarily determined by the concentration and viscosity of the solution and the velocity at which the glass substrate is withdrawn. Where the substrate is withdrawn slowly, a thin coating of gel adheres to the glass; where the glass substrate is quickly withdrawn from the coating solution, a thicker gel forms. This phenomenon of coating thickness versus withdrawal rate likewise is observed for coating processes other than sol-gel coating.

It is also well-known to vertically withdraw a substrate from a coating solution at a varying rate, so as to produce a coating which varies in thickness across the surface of the substrate in a direction parallel to the direction of withdrawal. Such a method has been used to prepare architectural glazings having a thicker glare-reducing coating at the top and a thinner glare-reducing coating near the bottom for unimpeded horizontal viewing therethrough.

U.S. Pat. No. 4,597,931 to Watanabe et al. discloses a method of manufacturing a windshield having a hard coat of varying thickness. The windshield is vertically withdrawn from a coating solution at a varying rate, so as to produce a thicker hard coat at an elevation where the windshield is contacted by a wiper blade, and a thinner hard coat at an elevation where the windshield attaches to the frame of the vehicle. The thickness of the coating varies in a direction parallel to the direction of withdrawal from the coating solution.

U.S. Pat. No. 4,455,322 to Weber discloses a method for coating lenses which likewise utilizes a variable speed for vertically withdrawing lenses to be coated from a coating solution, to prepare a coating which varies in thickness in a direction parallel to the direction of withdrawal from the coating solution.

It is well-known that anti-reflection coatings may be applied to optical or vision articles utilizing a sol-gel process. U.S. Pat. No. 4,271,210 to Yoldas discloses a sol-gel process, wherein a vitreous substrate is withdrawn at a uniform rate from an aluminum alkoxide solution and thereafter heated to form a uniform aluminum oxide anti-reflection layer thereon.

Anti-reflection coatings are particularly useful for the preparation of vehicle vision glazings; particularly windshields, for which maximum light transmission is desirable. Light reflected from a windshield is effectively not transmitted therethrough, and is therefore a transmission loss. As the angle of incidence of a windshield varies, when viewed from the eyes of a vehicle operator, the anti-reflection nature of the windshield (as well as the thickness of an anti-reflection coating) should also vary to provide optimal performance. Where a vehicle operator looks through the lower portion of a windshield, at a high angle of incidence, the anti-reflection coating should be thicker relative to the thickness of the anti-reflection layer at the top of the windshield where the operator looks through the windshield at a lower angle of incidence.

The application of an anti-reflection coating, having a differential thickness from the top to the bottom of a windshield, is very difficult because the glass blank to which such a coating is applied is in the form generally of a sector of an annulus. Therefore, the desired coating must have a constant thickness along any given arc of the annulus sector, but must vary from a thicker coating at the longest arc to a thinner coating at the shortest arc. Such a coating, which varies in thickness in more than one direction along the surface of the coated substrate, could not be applied by the well-known uniform vertical withdrawal or variable vertical withdrawal dip-coating techniques.

It would be desirable to devise a process for preparing a coating on a substrate by a dipping process, which coating has a differential thickness in more than one direction along the surface of the substrate. Such a process would be useful for differentially coating a vehicle windshield, to produce a windshield having a uniform anti-reflection coating thickness along any particular arc and a varying thickness from top to bottom.

SUMMARY OF THE INVENTION

Accordant with the present invention, a process for differentially coating at least a portion of a substrate has surprisingly been discovered. The process, which results in a coating that varies in thickness in more than one direction across the surface of the coated substrate, comprises the steps of:

A) immersing at least a portion of the substrate into a coating medium; and
B) simultaneously performing the steps of:
  (i) withdrawing the substrate from the coating medium in a predetermined direction at a predetermined rate; and
  (ii) pivoting the substrate at a predetermined angular velocity about an axis orthogonal to the direction of withdrawal.

Advantageously, the inventive process may be used to place an anti-reflection coating on a glass or plastic substrate. The rates of withdrawal and angular velocities may be held constant while the substrate is extracted from the coating medium, or may be varied to achieve an even more complex differential coating configuration.

The process of the present invention is particularly suited for the preparation of automotive or architectural glazings having anti-reflection coatings of differential thickness over the surfaces thereof.

BRIEF DESCRIPTION OF THE FIGURE

The novel features that are considered characteristic of the invention are set forth with particularity in the appended claims. The invention will best be understood, however, by reference to the accompanying description of specific embodiments when read in connection with the attendant FIGURE, which is a schematic elevational representation of a coating operation embodying the features of the present invention.

DETAILED DESCRIPTION OF THE PREFERRED EMBODIMENT

The present invention is directed to a process for differentially coating at least a portion of the surface of a substrate. By "differentially coating," as the term is used herein, is meant that a coating is applied which varies in thickness in more than one direction across the face of the coated substrate. Such coatings may be produced by a dip-coating procedure, employing the novel withdrawal techniques of the present invention.

Substrates which are useful for practicing the present invention include, but are not necessarily limited to, rigid, transparent substrates well-known in the art such as glass (both single sheet and laminated glass) and plastics, e.g., polycarbonates, polyacrylics, polyesters, and the like, as well as multilayered laminated structures prepared from same. A preferred substrate is prepared from a single sheet of glass, or a laminate made from multiple sheets of glass, suitable for use as an automotive glazing. Depending upon the ultimate use for the substrate, either a portion or the entire surface of the substrate may be differentially coated.

The substrate is at least partially immersed into a coating medium and withdrawn according to the present invention to form the differential coating. The coating medium may be virtually any material known to be useful for the application of a coating to the surface of a substrate by a dip-coating process. Contemplated equivalent coating media, having the same utility and operability according to the present invention, include, but are not necessarily limited to,: sol-gel solutions, for the application of an anti-reflection coating to glass; hard coat solutions, for the application of a scratch-resistant coating to plastic; liquid colorants, for the application of a color coating to a substrate; etc. Such coating media may conveniently be contained within an open-top dip tank, as is well-known in the art. The inventive process is particularly useful for differentially applying a sol-gel anti-reflection coating to an automotive glazing such as, for example, a windshield.

Generally, for conventional dip-coating processes, the withdrawal rate selected is a function of the coating thickness desired. The faster the withdrawal rate, the thicker the coating that adheres to the substrate. Coating thickness at any point on the surface of the substrate is generally a function of, inter alia,: the substrate withdrawal rate at any point on the surface of the substrate, i.e., the velocity of the substrate at a particular point on its surface as the substrate is withdrawn from the coating medium; the viscosity of the coating medium; and the density of the coating medium.

According to the inventive process, the substrate is immersed into the coating medium, and withdrawn therefrom in a predetermined direction at a predetermined rate. While the substrate is being withdrawn from the coating medium, it is simultaneously pivoted about an axis which is orthogonal to the direction of withdrawal. Such withdrawal is conveniently achieved utilizing conventional apparatus, such as electronically controlled robotic material handling equipment.

Generally, the predetermined direction in which the substrate is withdrawn from the coating medium is vertical, i.e., in a direction normal to the surface of the coating medium bath. However, withdrawal in a direction oblique from a line perpendicular to the surface of the coating medium bath is also contemplated by the present invention. The predetermined rate of withdrawal of the substrate from the coating medium will depend upon the desired thickness for the coating. Typically, withdrawal rates are in the range from about 1 centimeter per minute to about 75 centimeters per minute. Moreover, the rate of withdrawal may change over time as the substrate is withdrawn from the coating medium; i.e., the withdrawal rate may be accelerated or decelerated as the substrate is withdrawn, to achieve a differentially thicker or thinner coating.

As the substrate is being withdrawn from the coating medium bath, in a particular direction and at a fixed or variable rate, the substrate is simultaneously pivoted at a predetermined angular velocity about an axis which is orthogonal to the direction of withdrawal. The pivot axis may pass through the body of the substrate, or may be located external to the substrate. The predetermined angular velocity generally varies from about 1 centimeter per minute to about 75 centimeters per minute, when measured tangent to an arc at a point on the surface of the substrate. Furthermore, the angular velocity may vary over the time period during which the substrate is being withdrawn from the coating medium; i.e., the angular velocity may accelerate or decelerate during the withdrawal of the substrate from the coating medium bath.

In a preferred embodiment, the inventive coating method is utilized to place an anti-reflection coating on an automotive glazing such as, for example, a windshield. It is well-known that such glazings are generally installed at a high angle of incidence with respect to the generally horizontal line-of-sight of a vehicle occupant who views objects through the glazing. This angle of incidence is approximately equal to the angle formed between the surface of the glazing and the plane of the horizon, hereinafter referred to as the "installation angle." It is well-known that visible reflection of light rays from the surfaces of planar substrates may be reduced by the deposition thereon of various coatings such as metal oxides or other dielectric materials.

In modern automobiles, the installation angle of a windshield is often in the range from about 40° to about 70°. At these high angles of incidence, it is observed that the total reflectance from both surfaces of an uncoated glass sheet or glass laminate is from about 10% to about 30%. An increase in the reflectance of a transparent glazing corresponds to an equivalent decrease in the transmittance of visible light through the glazing. Thus, a transparent glazing which reflects 15% of the visible light therefrom conversely transmits only 85% of the visible light therethrough. By comparison, the reflectance of an uncoated single sheet of glass in a direction normal to its surface is only about 8%.

From a vehicle operator's viewpoint, the reflectance resulting from a high angle of incidence is greater when viewing objects through a windshield near its intersection with the hood of the vehicle, as opposed to when viewing objects through the top portion of the windshield near the shade band (in which case the operator's line-of-sight is approximately normal to the surface of the windshield). Therefore, the anti-reflection capability of the windshield ought to be greater near its base than at its top. Generally, this means that the anti-reflection coating thickness should be greater at the base of the windshield than at the top. This anti-reflection gradient may be achieved by the process of the present invention.

Referring now to the FIGURE, there is shown generally at 10 a windshield coating station, according to the present invention. A glass substrate 12, generally having a shape defined as a sector of an annulus is shown immediately after its withdrawal from a coating medium 14 such as, for example, an anti-reflection coating material which is contained in a dip tank 16. During withdrawal of the substrate 12 by conventional mechanical means (not shown), generally in a vertical direction as indicated by arrow 18, the substrate 12 is pivoted about an axis orthogonal to the vertical direction of withdrawal. The pivot axis is represented in the FIGURE by point 20. Therefore, during withdrawal of the substrate 12 from the coating medium 14, the longer edge 22 of the substrate 12 is withdrawn at a greater angular velocity than the shorter edge 24. Consequently, a thicker coating (represented in the FIGURE as heavier shading) is adhered to the surface of the substrate 12 in the arcuate area 26 adjacent the longer edge 22 than in the arcuate area 28 adjacent the shorter edge 24. Conventional masking means (not shown) may be used to exclude coating from one major surface of the substrate 12 while applying coating to the other major surface. Typically, an anti-reflection coating is placed on at least the inboard surface of an automotive windshield (the surface of the windshield closest to the vehicle operator). Furthermore, the predetermined angular velocity may be varied during the time the substrate is withdrawn, to provide more or less of a differential anti-reflection coating on the passenger side versus the operator side of the vehicle.

The coating medium useful in the process of the present invention may be, for example, a sol-gel solution. Such a solution may be prepared by dissolving metal-containing compounds into appropriate solvents. Preferred metal-containing compounds are metal alkoxides. Alcohols, particularly lower aliphatic alcohols having from one to four carbon atoms, are preferred as solvents, although other organic solvents such as, for example, ketones, esters, and mixtures of ketones and esters may be used. Generally, water is also added to the sol-gel coating medium. The metal-containing compounds are transformed in the sol-gel coating medium into alcoholates having moieties such as, for example, $-OC_2H_5$, $-OC_3H_7$, or $-OC_4H_9$, depending upon the solvent used. Practically any silicon- or titanium-containing compounds which are soluble in the appropriate solvents may be used to practice the present invention. Examples of silicon-containing compounds which are useful are tetraethyl orthosilicate, tetramethyl orthosilicate, and tetrapropyl orthosilicate. Examples of useful titanium-containing compounds are titanium ethoxide, titanium isopropoxide, titanium n-propoxide, titanium n-butoxide, titanium isobutoxide, titanium (diisopropoxide) bis(2,4-pentanedionate), and titanium 2-ethylhexoxide.

Upon withdrawal of the glass substrate from the sol-gel coating medium according to a preferred embodiment of the present invention, the resultant coating is dried in the presence of moisture (relative humidity from about 20% to about 60%) to leave as a residue a gel film having a differential thickness across the surface of the substrate. The gel film and substrate are then heated to a temperature which is far below the melting temperature of the glass substrate. The reactions that occur in the solid gel film following dipping and withdrawal are a combination of hydrolysis and condensation. As the substrate is heated to about 450° C., the condensation reactions begin to dominate. Reaction products, such as alcohols and water, are cleaved from the complex compounds contained in the gel. The coating densifies by these polycondensation reactions and other reactions to form a clear, dense, differential thickness coating that performs a variety of functions, e.g., anti-reflectivity.

From the foregoing description, one skilled in the art can easily ascertain the essential characteristics of this invention and, without departing from the spirit and scope thereof, can make various changes and modifications in the invention to adapt it to various usages and conditions. For example, the present invention may be used to provide successive, multiple coatings (e.g., a multi layered anti-reflection coating) on a substrate, each coating having the same or different differential coating thicknesses.

What is claimed is:

1. A process for differentially coating a substrate, comprising the steps of:
   A) immersing at least a portion of the substrate into a coating medium; and
   B) simultaneously performing the steps of:
      (i) withdrawing the substrate from the coating medium in a predetermined direction at a predetermined rate; and
      (ii) pivoting the substrate at a predetermined angular velocity about an axis orthogonal to the direction of withdrawal at a predetermined angular velocity selected to effect a differential coating of the coating medium on the substrate.

2. The process for differentially coating a substrate according to claim 1, wherein the substrate is a rigid, transparent glazing material selected from the group consisting of glass, plastic, and multi-layered laminates thereof.

3. The process for differentially coating a substrate according to claim 1, wherein the coating medium is a sol-gel useful for the preparation of an anti-reflection coating on the substrate.

4. The process for differentially coating a substrate according to claim 1, wherein the predetermined direction of withdrawal is normal to the surface of the coating medium.

5. The process for differentially coating a substrate according to claim 1, wherein the predetermined rate of withdrawal is from about 1 to about 75 centimeters per minute.

6. The process for differentially coating a substrate according to claim 5, wherein the predetermined rate of withdrawal varies while the substrate is being withdrawn from the coating medium.

7. The process for differentially coating a substrate according to claim 1, wherein the predetermined angular velocity is from about 1 to about 75 centimeters per minute.

8. The process for differentially coating a substrate according to claim 7, wherein the predetermined angular velocity varies while the substrate is being withdrawn from the coating medium.

9. A process for differentially coating an automotive glazing, comprising the steps of:

A) immersing at least a portion of the glazing into a coating medium; and

B) simultaneously performing the steps of:
   i) withdrawing the glazing from the coating medium in a direction normal to the surface of the coating medium at a predetermined rate from about 1 to about 75 centimeters per minute; and
   ii) pivoting the glazing about an axis orthogonal to the direction of withdrawal at a predetermined angular velocity from about 1 to about 75 centimeters per minute selected to effect a differential coating of the coating medium on the substrate.

10. The process for differentially coating an automotive glazing according to claim 9, wherein the predetermined rate of withdrawal varies while the substrate is being withdrawn from the coating medium.

11. The process for differentially coating an automotive glazing according to claim 9, wherein the predetermined angular velocity varies while the substrate is being withdrawn from the coating medium.

12. A process for applying a differential thickness anti-reflection coating to a glazing to be used as an automotive windshield, comprising the steps of:

A) immersing the glazing, comprising a rigid, transparent glazing material selected from the group consisting of glass, plastic, and multi-layered laminates thereof, into a coating medium, comprising a sol-gel solution including a metal-containing compound selected from the group consisting of silicon- and titantium-containing compounds; and B) simultaneously performing the steps of:
   i) withdrawing the glazing from the coating medium in a direction normal to the surface of the coating medium at a predetermined, optionally variable, rate from about 1 to about 75 centimeters per minute; and
   ii) pivoting the glazing about an axis orthogonal to the direction of withdrawal at a predetermined, optionally variable, angular velocity from about 1 to about 75 centimeters per minute selected to effect a differential coating of the coating medium on the substrate.

* * * * *